(12) United States Patent
You

(10) Patent No.: US 12,469,526 B2
(45) Date of Patent: Nov. 11, 2025

(54) INPUT/OUTPUT CIRCUIT, MEMORY DIE, MEMORY DEVICE, AND STORAGE DEVICE

(71) Applicant: SK hynix Inc., Icheon-si (KR)

(72) Inventor: Byoung Sung You, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 196 days.

(21) Appl. No.: 18/325,882

(22) Filed: May 30, 2023

(65) Prior Publication Data

US 2024/0221797 A1 Jul. 4, 2024

(30) Foreign Application Priority Data

Dec. 29, 2022 (KR) .................. 10-2022-0188833

(51) Int. Cl.
*G11C 7/10* (2006.01)
(52) U.S. Cl.
CPC .......... *G11C 7/1063* (2013.01); *G11C 7/1057* (2013.01); *G11C 7/1069* (2013.01)
(58) Field of Classification Search
CPC .... G11C 7/1063; G11C 7/1057; G11C 7/1069
See application file for complete search history.

(56) References Cited

U.S. PATENT DOCUMENTS

| | | | |
|---|---|---|---|
| 2007/0127279 A1* | 6/2007 | Suyama | G11C 16/26 365/1 |
| 2011/0307736 A1 | 12/2011 | George et al. | |
| 2012/0278538 A1* | 11/2012 | Nango | G06F 12/0246 711/E12.008 |
| 2015/0058527 A1 | 2/2015 | Venkata | |
| 2018/0261260 A1* | 9/2018 | Hirashima | G11C 7/1057 |

* cited by examiner

*Primary Examiner* — Han Yang
(74) *Attorney, Agent, or Firm* — WILLIAM PARK AND ASSOCIATES LTD.

(57) ABSTRACT

A duplex input/output circuit of a memory die includes an output circuit and an input circuit. The output circuit receives output data from a data line coupled to a buffer region and outputs the output data to an output bus, in response to a selecting signal, a read enable signal, and an output signal. The input circuit receives input data from an input bus and output the input data to the data line, in response to the selecting signal, the read enable signal, a write enable signal, and an input signal.

28 Claims, 14 Drawing Sheets

INPUT/OUTPUT CIRCUIT, MEMORY DIE, MEMORY DEVICE, AND STORAGE DEVICE

The present application claims priority under 35 U.S.C. § 119(a) to Korean application number 10-2022-0188833, filed on Dec. 29, 2022, in the Korean Intellectual Property Office, which is incorporated herein by reference in its entirety as set forth in full.

BACKGROUND

1. Technical Field

Various embodiments generally relate to a storage device, and, more particularly, to a memory device of the storage device.

2. Related Art

A storage device may be configured to store therein data provided from an external device in response to a write request from the external device. Furthermore, the storage device may be configured to provide stored data to the external device in response to a read request from the external device. The external device is an electronic device capable of processing data and may include a computer, a digital camera, a mobile phone and so forth. The storage device may be mounted in the external device to operate or may be fabricated to be capable of being connected to and detached from the external device to operate. The storage device may include a memory device configured to store therein data and a controller configured to control the memory device.

The controller may perform, as a background operation, a data move operation of moving data, which is stored in the memory device, into another location within the memory device. The data move operation may remove garbage accumulated within the memory device and may control the wear of the memory device, which enlarges the lifespan of the memory device. Also, the performance of the storage device may become improved as a time amount for the data move operation becomes less.

SUMMARY

In an embodiment, a duplex input and output (input/output) circuit of a memory die may include an output circuit and an input circuit. The output circuit may be configured to receive output data from a data line coupled to a buffer region and output the output data to an output bus, in response to a selecting signal, a read enable signal, and an output signal. The input circuit may be configured to receive input data from an input bus and output the input data to the data line, in response to the selecting signal, the read enable signal, a write enable signal, and an input signal.

In an embodiment, a memory die may include a cell region, a buffer region, a duplex input/output circuit and a control circuit. The cell region may include a plurality of memory regions. The buffer region may be configured to store data therein. The duplex input/output circuit may be configured to transfer output data from the buffer region to an output bus in response to a selecting signal and a read enable signal and configured to transfer input data from an input bus to the buffer region in response to the selecting signal and the read enable signal. The control circuit may be configured to generate the selecting signal.

In an embodiment, a memory device may include a duplex interface circuit, a first memory die and a second memory die. The first memory die may be coupled to the duplex interface circuit through a first input bus and a first output bus. The second memory die may be coupled to the duplex interface circuit through a second input bus and a second output bus.

In an embodiment, a storage device may include a memory device and a controller. The memory device may include a first memory die, a second memory die and a duplex interface circuit. The controller may be configured to control the memory device such that the first memory die outputs data to the duplex interface circuit and the second memory die receives the data from the duplex interface circuit. The outputting of the data by the first memory die and the receiving of the data by the second memory die may partially overlap with each other.

DETAILED DESCRIPTION

Hereinafter, examples of embodiments of the present disclosure will be described below with reference to the accompanying drawings. The words "simultaneous" and "simultaneously" as used herein with respect to processes mean that the processes take place on overlapping intervals of time. For example, if a first process takes place over a first interval of time and a second process takes place simultaneously over a second interval of time, then the first and second intervals at least partially overlap each other such that there exists a time at which the first and second processes are both taking place.

In accordance with an embodiment, provided may be an input/output circuit, a memory die, a memory device and a storage device capable of effectively performing a data move operation.

Figure 1:
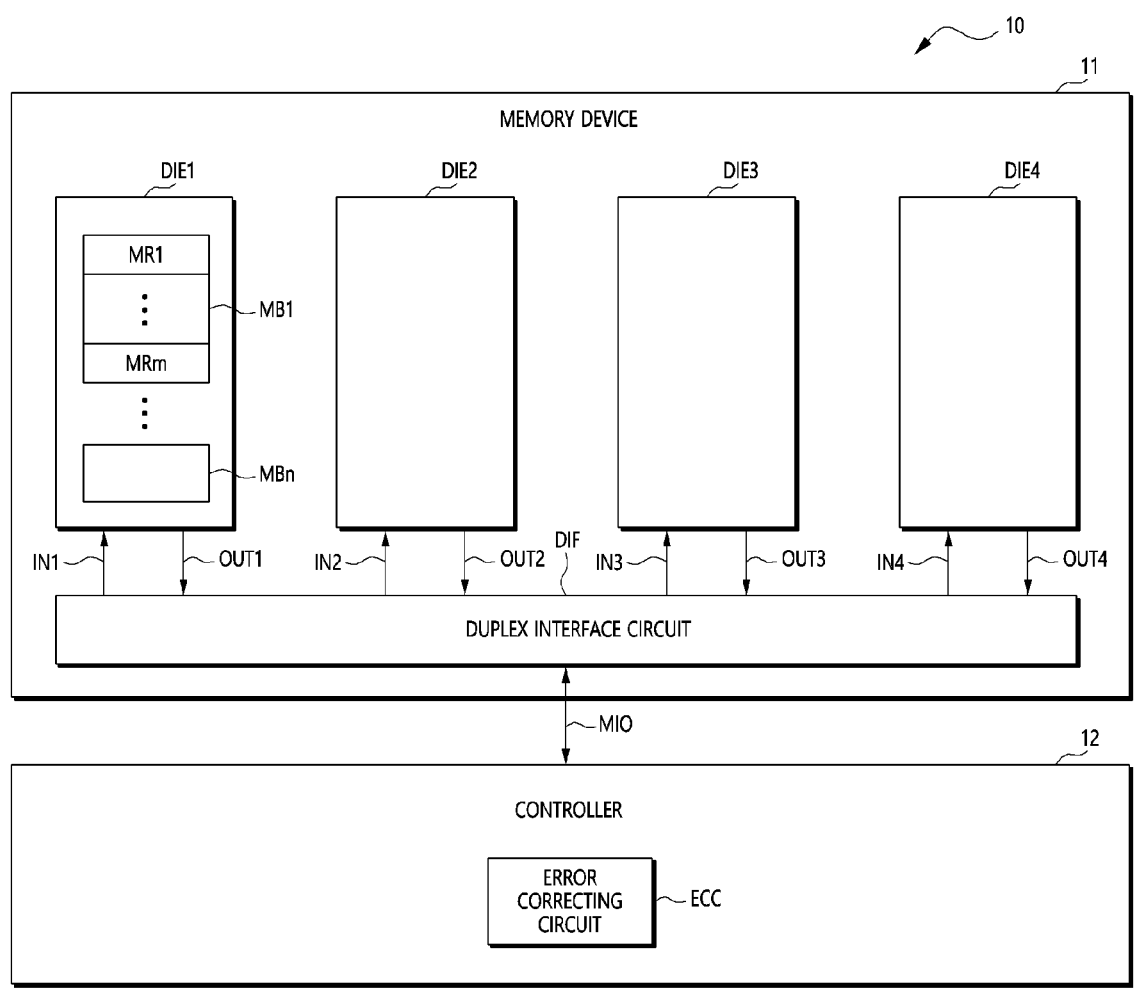
FIG. 1 is a block diagram illustrating an example of a storage device in accordance with an embodiment.

FIG. 1 is a block diagram illustrating an example of storage device 10 in accordance with an embodiment.

The storage device 10 may be configured to store therein data provided from an external device, e.g., a host device, in response to a write request from the external device. Furthermore, the storage device 10 may be configured to provide stored data to the external device in response to a read request from the external device.

The storage device 10 may include a personal computer memory card international association (PCMCIA) card, a smart media card, a memory stick, various multimedia cards (e.g., MMC, eMMC, RS-MMC and MMC-micro), secure digital (SD) cards (e.g., SD, Mini-SD and Micro-SD), a universal flash storage (UFS) or a solid-state drive (SSD).

The storage device 10 may include a memory device 11 and a controller 12.

The memory device 11 may operate under the control of the controller 12. Examples of operations of the memory device 11 may include a read operation, a write operation (i.e., a program operation), an erase operation and so forth.

The memory device 11 may be implemented by various types of memory device such as a NAND flash memory, a 3-dimensional (3D) NAND flash memory, a NOR flash memory, a resistive random-access memory (RRAM), a phase change RAM (PRAM), a Magneto-resistive RAM (MRAM), a ferroelectric RAM (FRAM), a spin transfer torque RAM (STT-RAM) and so forth.

The memory device 11 may include first to fourth memory dies DIE1 to DIE4 and a duplex interface circuit DIF. FIG. 1. For example, illustrates four memory dies DIE1 to DIE4 within the memory device 11.

Under the control of the controller 12, each of the first to fourth memory dies DIE1 to DIE4 may perform a read operation, a program operation, an erase operation and so forth in an independent manner and in a parallel manner. The first to fourth memory dies DIE1 to DIE4 may be distinguished from each other through different memory die addresses. In response to a memory die address from the controller 12, one indicated by the memory die address among the first to fourth memory dies DIE1 to DIE4 may perform an operation under the control of the controller 12.

Each of the first to fourth memory dies DIE1 to DIE4 may be coupled to the duplex interface circuit DIF through a corresponding input bus and a corresponding output bus. Each of the first to fourth memory dies DIE1 to DIE4 may receive data from the duplex interface circuit DIF through the corresponding input bus and may provide data to the duplex interface circuit DIF through the corresponding output bus.

The first to fourth memory dies DIE1 to DIE4 may be configured in a similar manner to each other and may perform a similar operation to each other. For example, the first memory die DIE1 may be coupled to the duplex interface circuit DIF through a first input bus IN1 and a first output bus OUT1. The first memory die DIE1 may include a plurality of memory blocks MB1 to MBn. Each of the plurality of memory blocks MB1 to MBn may include a plurality of memory regions MR1 to MRm. Memory cells included in the same one among the plurality of memory regions MR1 to MRm may be coupled to the same word line and may be programmed together at the same time.

Each of the memory cells may be utilized as a single level cell (SLC) or an extra level cell (XLC) according to a density, i.e., a number of bits that the memory cell is allowed to store therein. The XLC may be any of a multi level cell (MLC) capable of storing therein two (2) bits, a triple level cell (TLC) capable of storing therein three (3) bits and a quad level cell (QLC) capable of storing therein four (4) bits. The density of a memory cell may have any value selected from a range between one (1) and a maximum density. The maximum density may be determined according to a performance of the memory die and a policy of the controller 12. Memory region and memory block including the SLCs may be referred to as SLC memory region and SLC memory block. Memory region and memory block including the XLCs may be referred to as XLC memory region and XLC memory block.

A memory region including memory cells having the density of 'k' may logically include 'k' number of sub-regions or pages. For example, a TLC memory region may logically include three (3) number of pages, i.e., a least significant bit (LSB) page (or a page of the lowest level) that is to store therein LSBs, a central significant bit (CSB) page (or a page of an intermediate level) that is to store therein CSBs and a most significant bit (MSB) page (or a page of the highest level) that is to store therein MSBs. For example, a QLC memory region may logically include four (4) number of pages, i.e., a LSB page that is to store therein LSBs, a first CSB page (or a page of a first intermediate level) that is to store therein first CSBs, a second CSB page (or a page of a second intermediate level) that is to store therein second CSBs and a MSB that is to store therein MSBs. Under the control of the controller 12, a memory die may perform program operations on a plurality of pages included in a single memory region together at the same time.

The duplex interface circuit DIF may be coupled to the controller 12 through a memory bus MIO. The duplex interface circuit DIF may couple, to the memory bus MIO, the first to fourth input buses IN1 to IN4 and the first to fourth output buses OUT1 to OUT4. Therefore, the duplex interface circuit DIF may transfer data, which provided from the controller 12 through the memory bus MIO, to the first to fourth memory dies DIE1 to DIE4 through the first to fourth input buses IN1 to IN4. Further, the duplex interface circuit DIF may transfer data, which provided from the first to fourth memory dies DIE1 to DIE4 through the first to fourth output buses OUT1 to OUT4, to the controller 12 through the memory bus MIO.

The duplex interface circuit DIF may couple each of the first to fourth output buses OUT1 to OUT4 to any of the first to fourth input buses IN1 to IN4. Therefore, the duplex interface circuit DIF may transfer, during a duplex data move operation that will be described later in detail, data from each of the first to fourth output buses OUT1 to OUT4 to any of the first to fourth input buses IN1 to IN4.

The controller 12 may control overall operations of the storage device 10. The controller 12 may control the memory device 11 according to a request from a host device. For example, the controller 12 may store, into the memory device 11, data from the host device according to a write request from the host device. For example, the controller 12 may read data from the memory device 11 and may provide the host device with the read data, according to a read request from the host device. Through the memory die addresses respectively allocated to the first to fourth memory dies DIE1 to DIE4, the controller 12 may individually control each of the first to fourth memory dies DIE1 to DIE4. The controller 12 may control the first to fourth memory dies DIE1 to DIE4 by providing the first to fourth memory dies DIE1 to DIE4 with various control signals through one or more control signal lines (not illustrated) commonly or individually coupled to the first to fourth memory dies DIE1 to DIE4.

The controller 12 may include an error correcting circuit ECC. The error correcting circuit ECC may perform an error correcting operation on data read from the memory device 11 and may determine whether a result of the error correcting operation is failed or successful. When the result of the error correcting operation is determined as successful, all errors included in the read data are error-corrected. When the result of the error correcting operation is determined as failed, all errors included in the read data are not error-corrected.

In order to perform a managing operation that is internally required, the controller 12 may control the memory device 11 independently of the host device, i.e., even without a request from the host device. For example, the managing operation may include one or more of wear-levelling operation, garbage collection operation, erase operation and so forth. In an embodiment, the managing operation may be performed according to a request from the host device.

The managing operation may include a data move operation of moving data from a source location to a target location within the memory device 11. A source location may be any among a source memory die, a source memory block, a source memory region and a source page. A target location may be any among a target memory die, a target memory block, a target memory region and a target page. A source location and a target location may be included in the same memory die or different memory dies.

The controller 12 may determine a source location and a target location within the memory device 11 and may perform a duplex data move operation. During the duplex data move operation, the controller 12 might not store therein data from a source location and the error correcting circuit ECC might not encode the data from the source location, before moving the data to a target memory die. During the duplex data move operation, output of data from a source memory die and input of data into a target memory die may be executed in a parallel manner through the duplex interface circuit DIF. Accordingly, in an embodiment, the duplex data move operation may minimize the latency of the managing operation.

Specifically, the controller 12 may control the memory device 11 such that a source memory die outputs data to the duplex interface circuit DIF and a target memory die receives the data from the duplex interface circuit DIF. The process that the data is output from the source memory die and the process that the data is input into the target memory die may partially overlap each other. The source memory die may output the data to the duplex interface circuit DIF through the output bus and the target memory die may receive the data from the duplex interface circuit DIF through the input bus. The duplex interface circuit DIF may transfer the data from the source memory die directly into the target memory die. That is, the data from the source memory die may be transferred directly into the target memory die through the duplex interface circuit DIF without via the controller 12.

In an embodiment, during a duplex data move operation, the controller 12 may provide the memory device 11 with a read enable signal, which toggles, and the source memory die and the target memory die may receive the toggling read enable signal at the same time. In response to the read enable signal, the source memory die may output the data to the duplex interface circuit DIF, the data being in synchronized with the read enable signal. In response to the read enable signal, the target memory die may receive the data from the duplex interface circuit DIF, the data being in synchronized with the read enable signal. For example, the read enable signal may be transferred through one or more read enable signal lines commonly or individually coupled between the controller 12 and the first to fourth memory dies DIE1 to DIE4.

In an embodiment, until receiving all the data to be stored into a target memory region, the target memory die may keep, into a buffer region, the data from the duplex interface circuit DIF. Upon receiving all the data to be stored into the target memory region, the target memory die may store all the data together into the target memory region.

In an embodiment, in order to control the source memory die and the target memory die, the controller 12 may provide a setting command to the target memory die and then may provide a read command to the source memory die. For example, the setting command may be transferred through the memory bus MIO and the input bus coupled to the target memory die. For example, the read command may be transferred through the memory bus MIO and the input bus coupled to the source memory die.

In an embodiment, while the target memory die is receiving the data, the controller 12 may receive the data from the duplex interface circuit DIF through the memory bus MIO and may perform, through the error correcting circuit ECC, an error correcting operation on the data to perform a subsequent operation according to a result of the error correcting operation.

Specifically, when the error correcting operation is successful, the controller 12 may determine to further move subsequent data in a case that all the data to be stored into all target pages within the target memory die are determined not to be completely moved yet into the target memory die.

When the error correcting operation is successful, the controller 12 may determine the duplex data operation as successful to end the process in a case that all the data to be stored into all target pages within the target memory die are determined to be completely moved into the target memory die. Regardless of the result of the error correcting operation, the target memory die may store all the data together into the target pages within the target memory die in the case that all the data to be stored into all target pages within the target memory die are determined to be completely moved into the target memory die.

When the error correcting operation fails, the controller 12 may determine the duplex data move operation as a fail to perform a predetermined recovery operation on the data. The word "predetermined" as used herein with respect to a parameter, such as a predetermined recovery operation and parameters, means that a value for the parameter is determined prior to the parameter being used in a process or algorithm. For some embodiments, the value for the parameter is determined before the process or algorithm begins. In other embodiments, the value for the parameter is determined during the process or algorithm but before the parameter is used in the process or algorithm.

FIGS. 2A to 2F are diagrams illustrating a duplex data move operation of the storage device 10 illustrated in FIG. 1 in accordance with an embodiment.

Figure 2A:
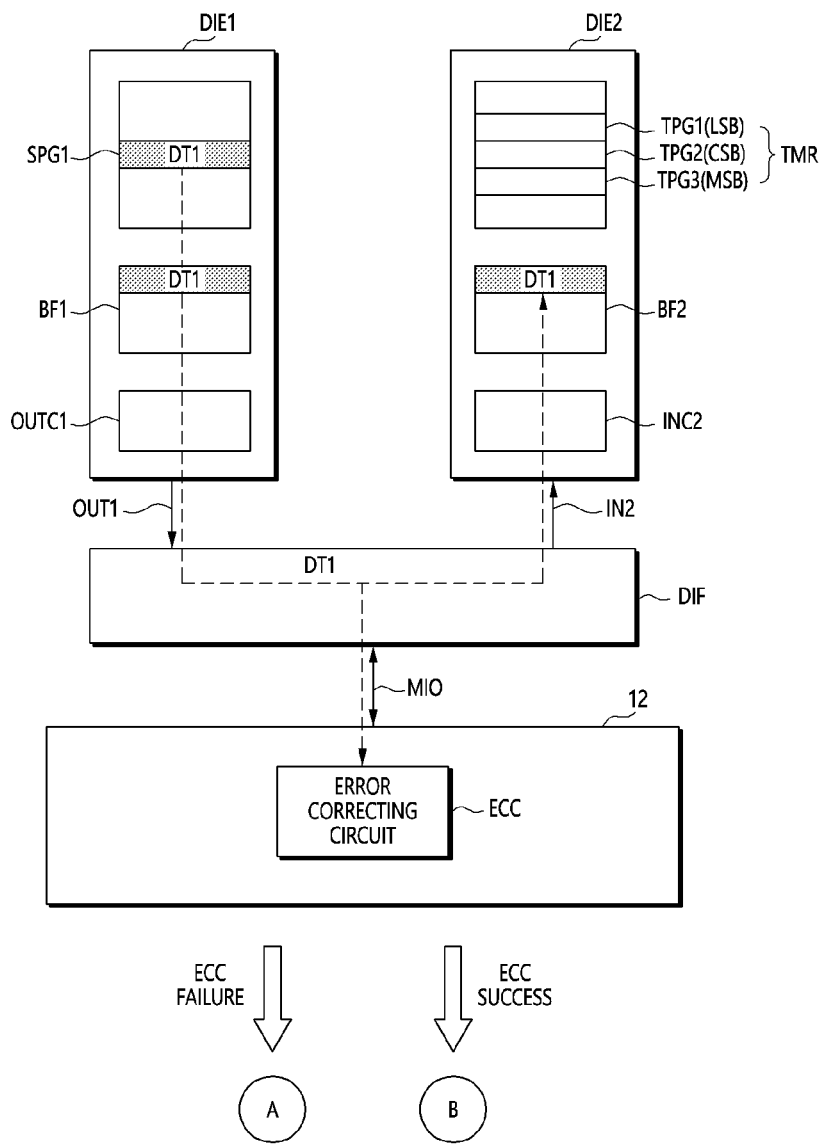
FIGS. 2A, 2B, 2C, 2D, 2E, and 2F are diagrams illustrating a duplex data move operation of the storage device illustrated in FIG. 1 in accordance with an embodiment.

Referring to FIG. 2A, the first memory die DIE1 may include a first source page SPG1, a first buffer region BF1 and a first output circuit OUTC1. The second memory die DIE2 may include a target memory region TMR, a second buffer region BF2 and a second input circuit INC2. The duplex interface circuit DIF may be coupled to the first output circuit OUTC1 through the first output bus OUT1 and may be coupled to the second input circuit INC2 through the second input bus IN2. For example, the density of the target memory region TMR may be three (3).

The controller 12 may determine the first memory die DIE1 as a source memory die and may determine the second memory die DIE2 as a target memory die. The controller 12 may control the memory device 11 to move first data DT1 from the first source page SPG1 of the first memory die DIE1 into a first target page TPG1, i.e., a LSB page within the target memory region TMR of the second memory die DIE2.

Specifically, the first memory die DIE1 may read the first data DT1 from the first source page SPG1 to store the first data DT1 into the first buffer region BF1 and may output the first data DT1 from the first buffer region BF1 to the first output bus OUT1 through the first output circuit OUTC1.

The duplex interface circuit DIF may transfer the first data DT1 from the first output bus OUT1 to the second memory die DIE2 through the second input bus IN2 and at the same time to the controller 12 through the memory bus MIO.

The second memory die DIE2 may receive the first data DT1 from the second input bus IN2 through the second input circuit INC2 and may store the first data DT1 into the second buffer region BF2. Instead of performing a program operation on the first data DT1, the second memory die DIE2 may end an operation (or may enter a ready state) while keeping the first data DT1 in the second buffer region BF2.

The controller 12 may receive the first data DT1 from the memory bus MIO and the error correcting circuit ECC may perform an error correcting operation on the first data DT1. When the error correcting operation fails on the first data DT1 (i.e., the ECC failure), the operation may proceed to a case A. When the error correcting operation succeeds on the first data DT1 (i.e., the ECC success), the operation may proceed to a case B.

Figure 2B:
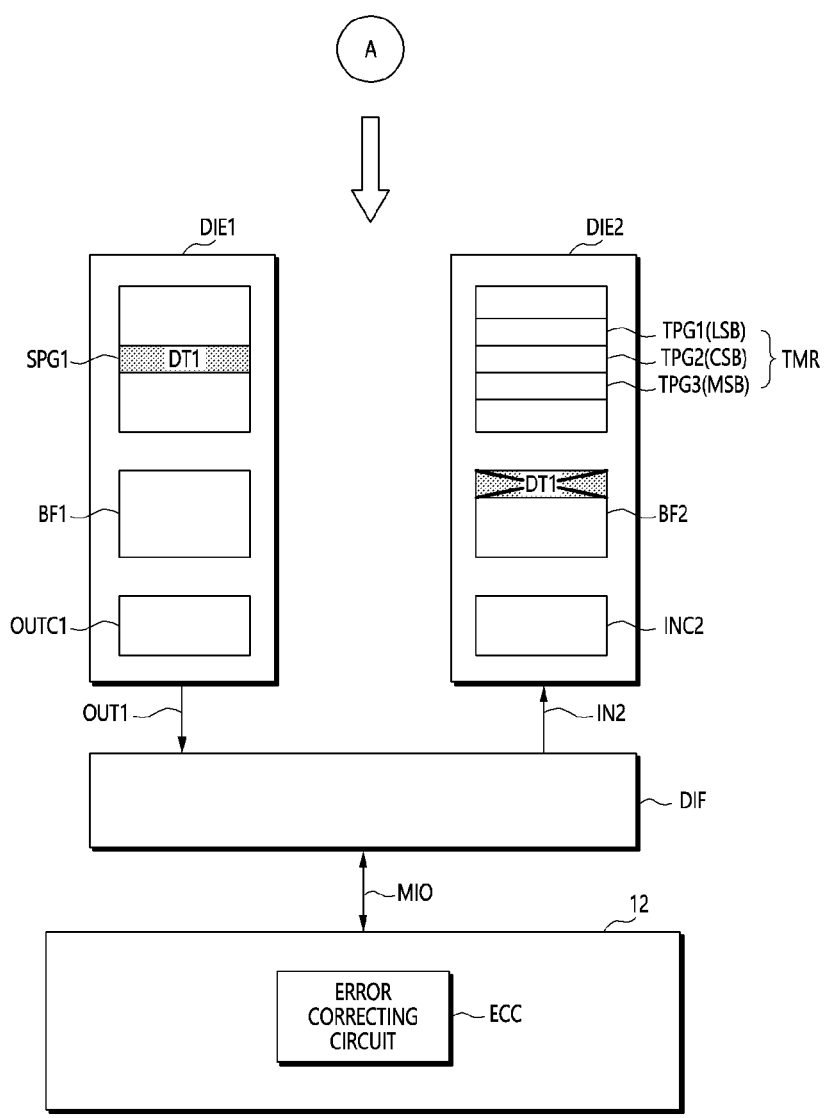

Referring to FIG. 2B representing the case A, the controller 12 may determine the duplex data move operation as a fail. In an embodiment, the controller 12 may perform a predetermined recovery operation on the first data DT1 stored in the first source page SPG1. Because the second buffer region BF2 is volatile, the first data DT1 stored in the second buffer region BF2 may be reset when the second memory die DIE2 performs another operation.

Figure 2C:
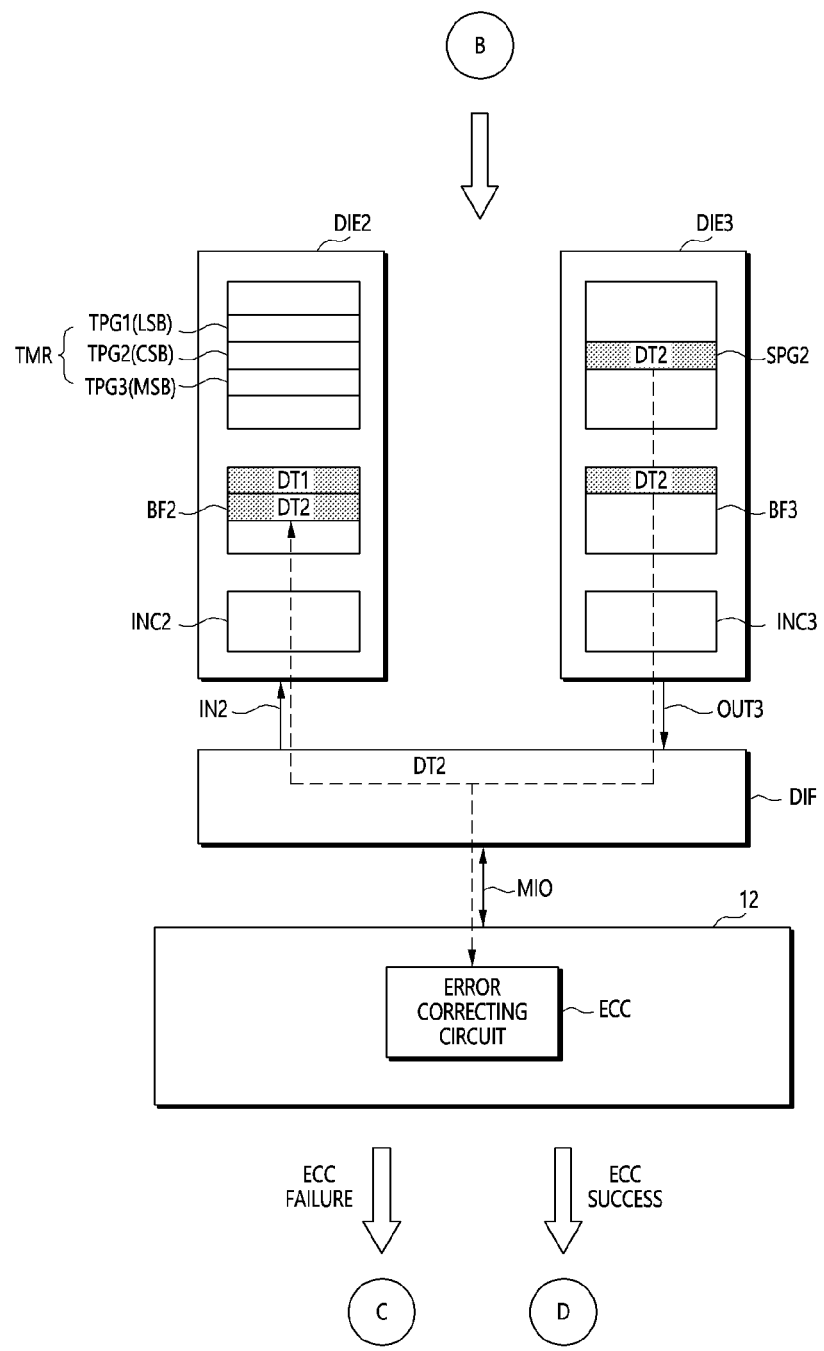

Referring to FIG. 2C representing the case B, the controller 12 may determine to further move, into the second memory die DIE2, subsequent data, i.e., second data DT2, to be stored in a second target page TPG2.

Specifically, the controller 12 may determine the third memory die DIE3 as another source memory die and may determine the second memory die DIE2 as the target memory die. The controller 12 may control the memory device 11 to move the second data DT2 from a second source page SPG2 of the third memory die DIE3 into the second target page TPG2, i.e., a CSB page within the target memory region TMR of the second memory die DIE2. The third memory die DIE3 and the second memory die DIE2 may perform the similar operations to the first memory die DIE1 and the second memory die DIE2 as described with reference to FIG. 2A. Instead of performing a program operation on the first data DT1 and the second data DT2, the second memory die DIE2 may end an operation (or may enter a ready state) while keeping the first data DT1 and the second data DT2 in the second buffer region BF2.

The controller 12 may receive the second data DT2 from the memory bus MIO and the error correcting circuit ECC may perform an error correcting operation on the second data DT2. When the error correcting operation fails on the second data DT2 (i.e., the ECC failure), the operation may proceed to a case C. When the error correcting operation succeeds on the second data DT2 (i.e., the ECC success), the operation may proceed to a case D.

Figure 2D:
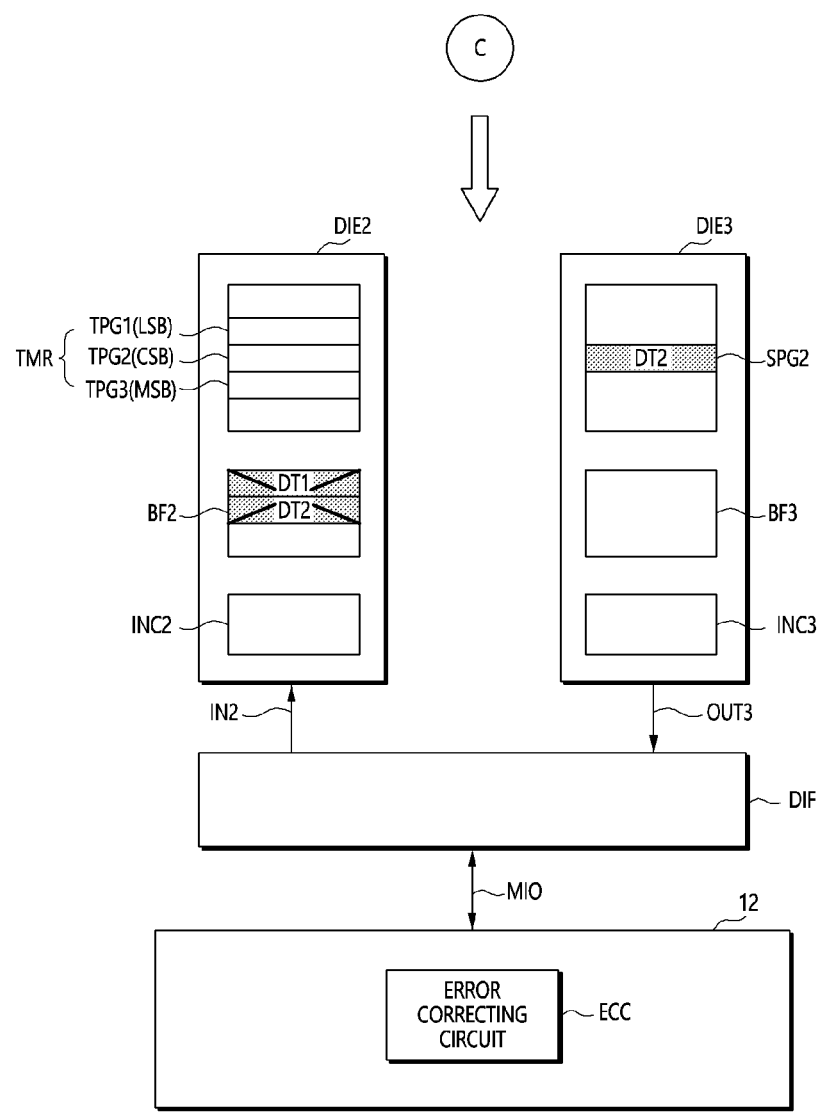

Referring to FIG. 2D representing the case C, the controller 12 may determine the duplex data move operation as a fail. In an embodiment, the controller 12 may perform a predetermined recovery operation on the second data DT2 stored in the second source page SPG2. Because the second buffer region BF2 is volatile, the first data DT1 and the second data DT2 stored in the second buffer region BF2 may be reset when the second memory die DIE2 performs another operation.

Figure 2E:
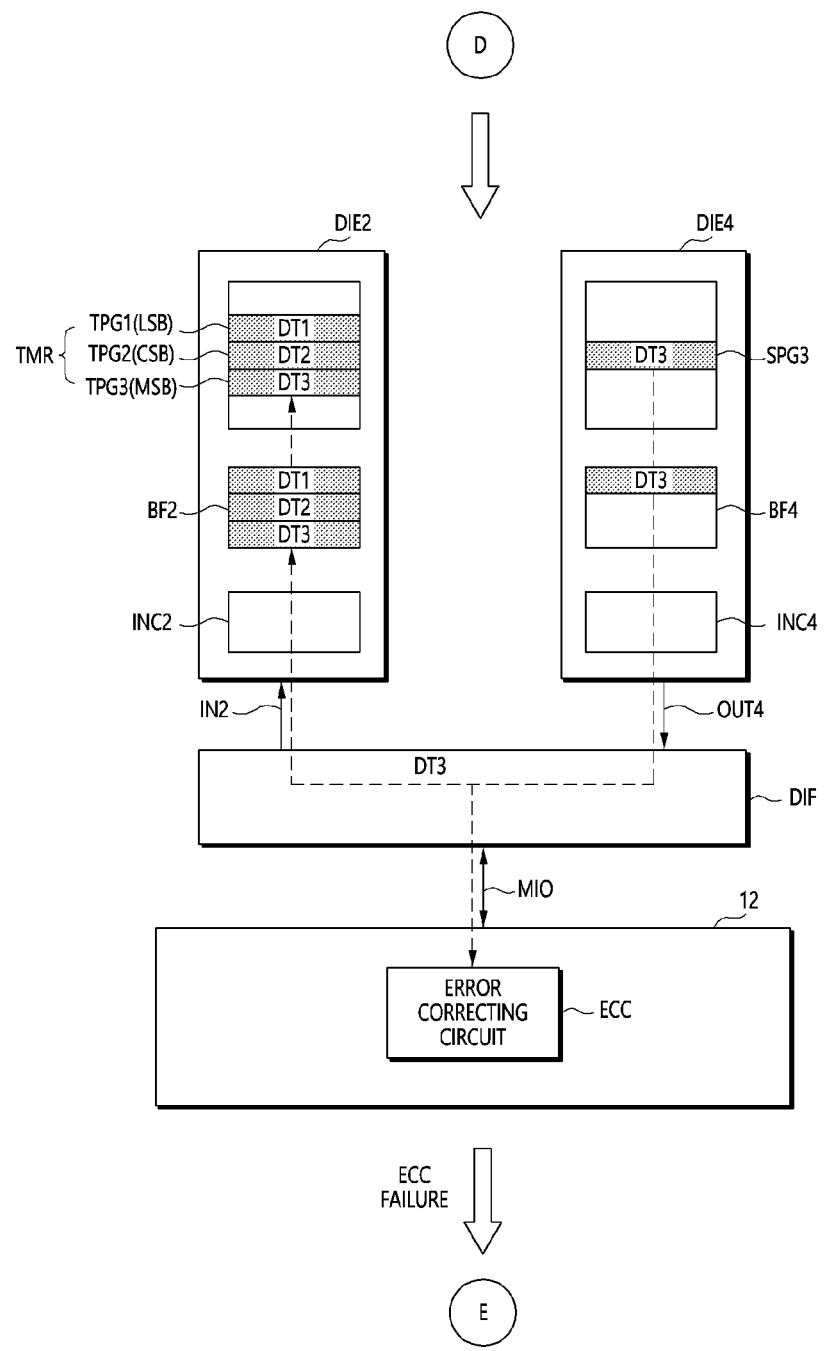

Referring to FIG. 2E representing the case D, the controller 12 may determine to further move, into the second memory die DIE2, subsequent data, i.e., third data DT3, to be stored in a third target page TPG3.

Specifically, the controller 12 may determine the fourth memory die DIE4 as another source memory die and may determine the second memory die DIE2 as the target memory die. The controller 12 may control the memory device 11 to move the third data DT3 from a third source page SPG3 of the fourth memory die DIE4 into the third target page TPG3, i.e., a MSB page within the target memory region TMR of the second memory die DIE2. The fourth memory die DIE4 and the second memory die DIE2 may perform the similar operations to the first memory die DIE1 and the second memory die DIE2 as described with reference to FIG. 2A.

When the third data DT3 is stored into the second buffer region BF2, the second memory die DIE2 may determine that the data to be stored in the target memory region TMR are all gathered into the second buffer region BF2 and may store the first to third data DT1 to DT3 together into the target memory region TMR. The second memory die DIE2 may perform a program operation on the target memory region TMR regardless of the result of an error correcting operation on the third data DT3.

The controller 12 may receive the third data DT3 from the memory bus MIO and the error correcting circuit ECC may perform the error correcting operation on the third data DT3. When the error correcting operation fails on the third data DT3 (i.e., the ECC failure), the operation may proceed to a case E. When the error correcting operation succeeds on the third data DT3 (i.e., the ECC success), the controller 12 may determine the duplex data move operation as successful and the operation may end.

Figure 2F:
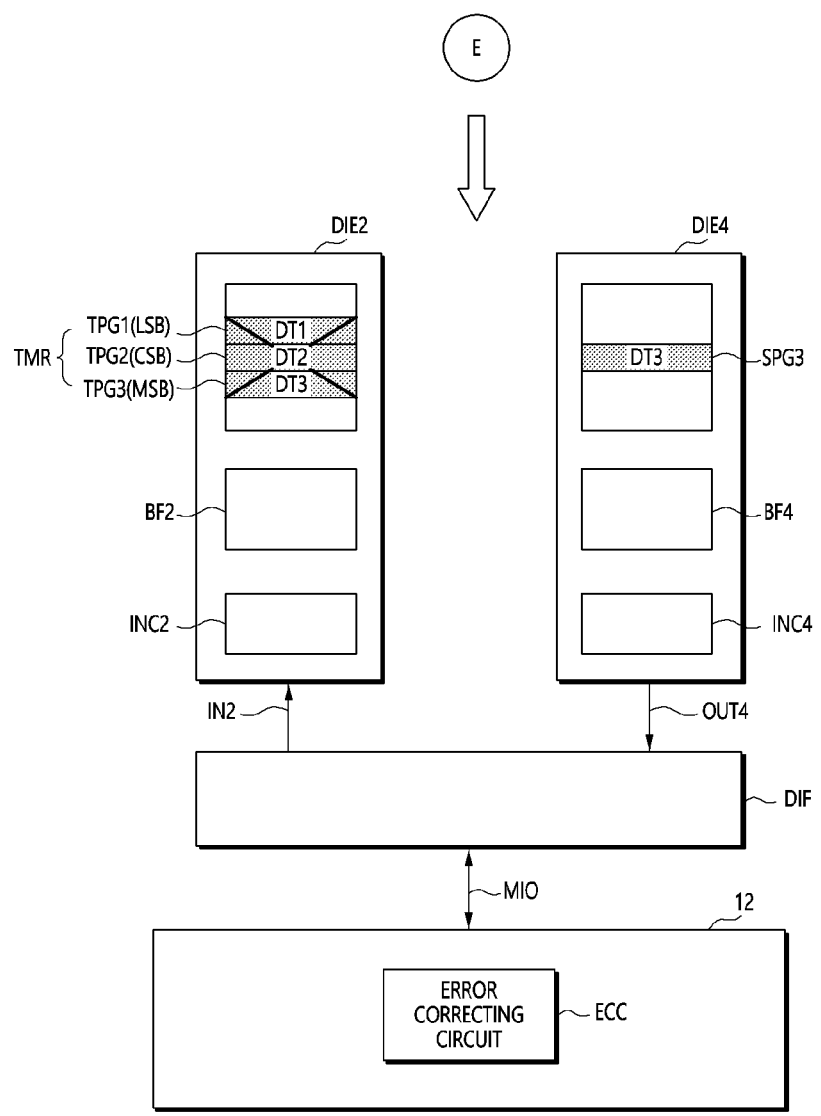

Referring to FIG. 2F representing the case E, the controller 12 may determine the duplex data move operation as a fail. In an embodiment, the controller 12 may perform a predetermined recovery operation on the third data DT3 stored in the third source page SPG3. In an embodiment, the controller 12 may invalidate the first to third data DT1 to DT3 stored in the target memory region TMR.

Figure 3:
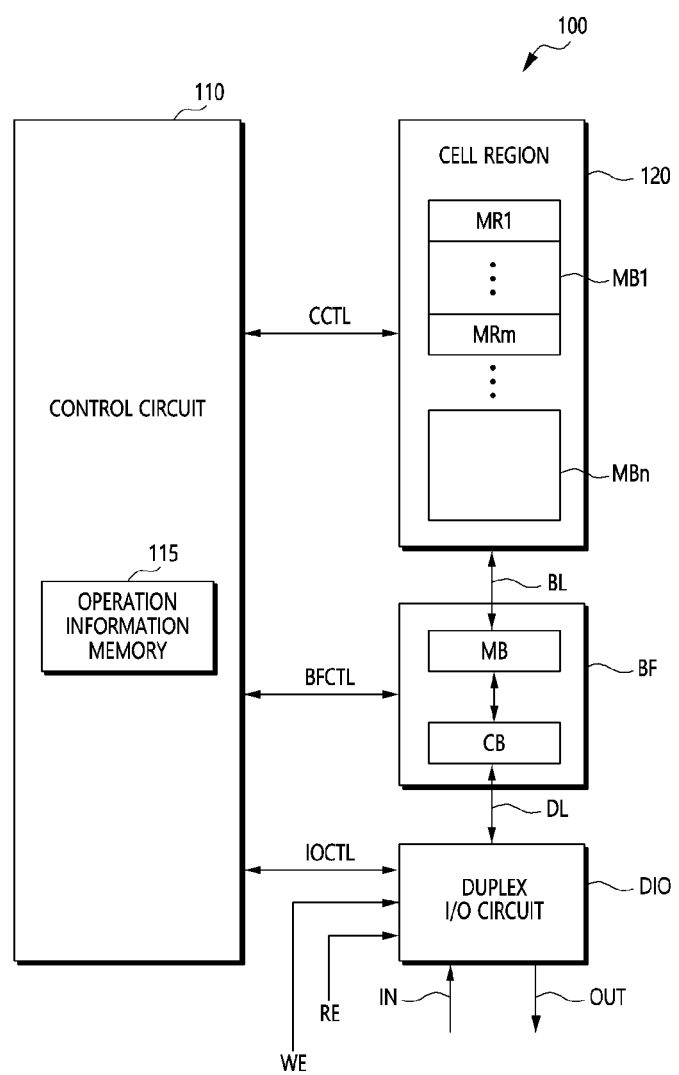
FIG. 3 is a block diagram illustrating a memory die in accordance with an embodiment.

FIG. 3 is a block diagram illustrating a memory die 100 in accordance with an embodiment. Each of the first to fourth memory dies DIE1 to DIE4 illustrated in FIG. 1 may be configured and perform an operation in a similar manner to the memory die 100.

Referring to FIG. 3, the memory die 100 may include a control circuit 110, a cell region 120, a buffer region BF and a duplex input/output circuit DIO.

Under the control of the controller 12, the control circuit 110 may control an internal operation of the memory die 100. Specifically, the control circuit 110 may generate one or more cell control signals CCTL and may control an operation of the cell region 120 through the cell control signals CCTL. The control circuit 110 may generate one or more buffer control signals BFCTL and may control an operation of the buffer region BF through the buffer control signals BFCTL. The control circuit 110 may generate one or more input/output control signals IOCTL and may control an operation of the duplex input/output circuit DIO through the input/output control signals IOCTL. Under the control of the controller 12, the control circuit 110 may control the memory die 100 to operate as a source memory die or a target memory die during a duplex data move operation.

The control circuit 110 may include an operation information memory 115. The control circuit 110 may control an operation of the memory die 100 by referring to the operation information memory 115. By referring to the operation information memory 115, the control circuit 110 may generate at least one of the cell control signals CCTL, the buffer control signals BFCTL and the input/output control signals IOCTL. The input/output control signals IOCTL may include a selecting signal SEL, a first voltage signal V1, a second voltage signal V2, an output signal OUTS and an input signal INS, which will be described in detail with reference to FIG. 4.

The operation information memory 115 may store therein various information on operations of the memory die 100. The operation information memory 115 may store therein various parameters set by the controller 12. Under the control of the controller 12, the control circuit 110 may store information into the operation information memory 115 and may change the stored information. As described later, the control circuit 110 may receive, from the controller 12, a setting command including predetermined parameters and may store, into the operation information memory 115, the parameters within the setting command.

In response to the cell control signals CCTL, the cell region 120 may store therein data from a first buffer MB within the buffer region BF. In response to the cell control signals CCTL, the cell region 120 may provide the first buffer MB with the data therefrom. The cell region 120 may be coupled to the first buffer MB through bit lines BL. Data may be transferred through the bit lines BL between the cell region 120 and the first buffer MB.

The cell region 120 may include a plurality of memory blocks MB1 to MBn. Each of the plurality of memory blocks MB1 to MBn may include a plurality of memory cells each configured to substantially store therein data. Each of the plurality of memory blocks MB1 to MBn may be a unit, on which the memory die 100 performs an erase operation at a time. Data stored in one of the plurality of memory blocks MB1 to MBn may be erased together at a time. Each of the plurality of memory blocks MB1 to MBn may include the plurality of memory regions MR1 to MRm.

In response to the buffer control signals BFCTL, the buffer region BF may store therein data from the duplex input/output circuit DIO before the data is stored into the cell region 120. In response to the buffer control signals BFCTL, the buffer region BF may store data read from the cell region 120 before the data is provided to the duplex input/output circuit DIO. The buffer region BF may be coupled to the duplex input/output circuit DIO through data lines DL. Data may be transferred through the data lines DL between the buffer region BF and the duplex input/output circuit DIO.

The buffer region BF may include a first buffer MB (e.g., a main buffer) and a second buffer CB (e.g., a cache buffer) coupled to each other. The first buffer MB may be coupled to the cell region 120 and the second buffer CB may be coupled to the duplex input/output circuit DIO. Data transferred from the cell region 120 into the first buffer MB may be moved into the second buffer CB to be provided to the duplex input/output circuit DIO. Data transferred from the duplex input/output circuit DIO into the second buffer CB may be moved into the first buffer MB to be stored into the cell region 120.

In response to the input/output control signals IOCTL, the duplex input/output circuit DIO may provide the second buffer CB within the buffer region BF with data from the input bus IN. In response to the input/output control signals IOCTL, the duplex input/output circuit DIO may output, to the output bus OUT, data from the second buffer CB. For example, each size of the input bus IN and the output bus OUT may be of eight (8) bits, which will not limit the embodiment. The input bus IN and the output bus OUT may be coupled to the duplex interface circuit DIF illustrated in FIG. 1.

The read enable signal RE may be transferred from the controller 12 to the duplex input/output circuit DIO. The read enable signal RE may toggle when data is output from the duplex input/output circuit DIO to the output bus OUT. During a normal read operation other than a read operation performed during a duplex data move operation, the duplex input/output circuit DIO may output, to the output bus OUT, data synchronized with the read enable signal RE. During a duplex data move operation on the memory die 100 serving as a source memory die, the duplex input/output circuit DIO may output, to the output bus OUT, data synchronized with the read enable signal RE. During a duplex data move operation on the memory die 100 serving as a target memory die, the duplex input/output circuit DIO may receive, from the input bus IN, data synchronized with the read enable signal RE in response to the read enable signal RE.

The write enable signal WE may be transferred from the controller 12 to the duplex input/output circuit DIO. The write enable signal WE may toggle when data is input from the input bus IN to the duplex input/output circuit DIO. During a normal program operation other than a program operation performed during a duplex data move operation, the duplex input/output circuit DIO may receive, from the input bus IN, data synchronized with the write enable signal WE in response to the write enable signal WE. For example, the write enable signal WE may be transferred through one or more write enable signal lines (not illustrated) commonly or individually coupled between the controller 12 and the first to fourth memory dies DIE1 to DIE4 illustrated in FIG. 1.

Figure 4:
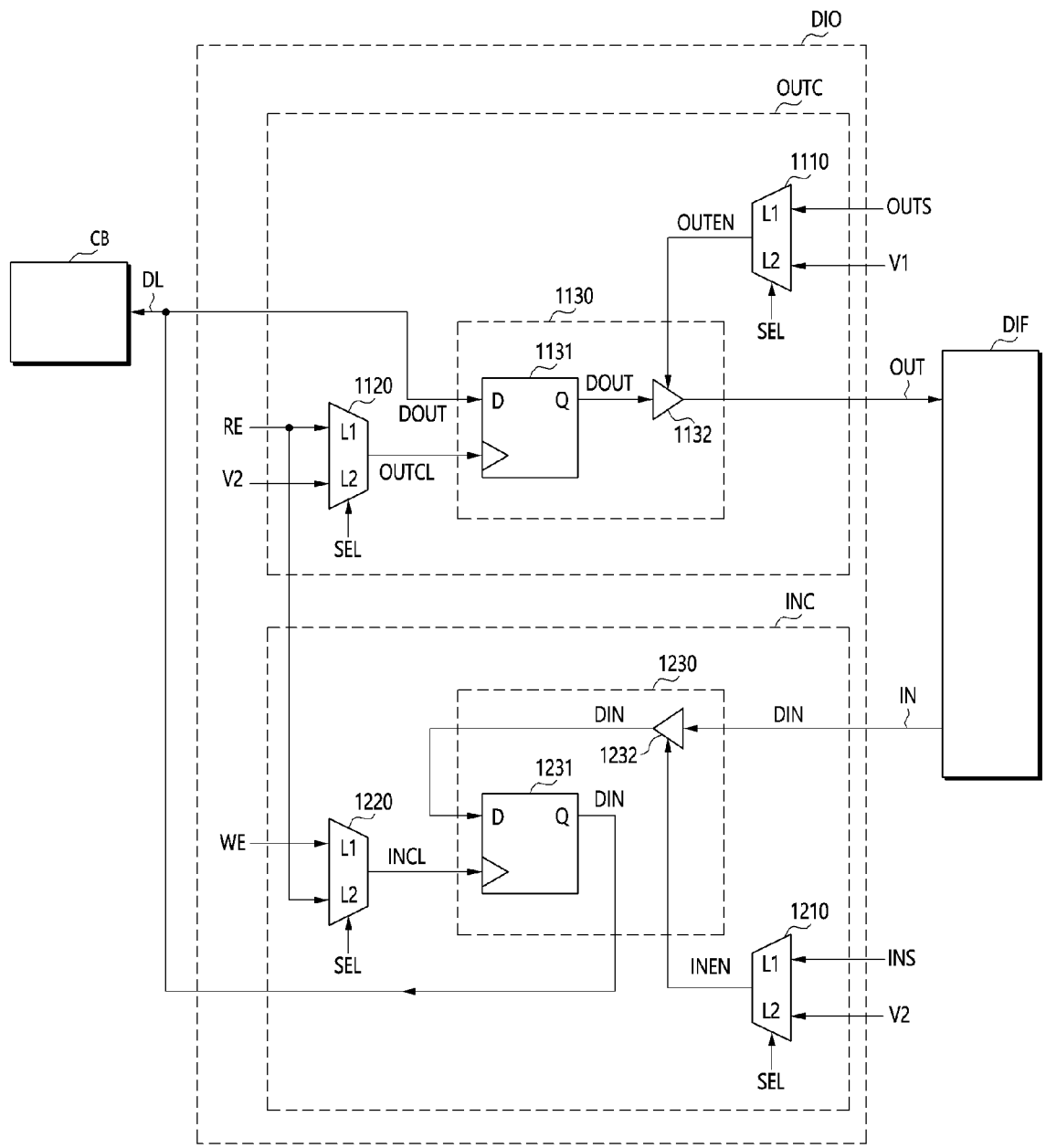
FIG. 4 is a circuit diagram illustrating a duplex input/output circuit illustrated in FIG. 3 in accordance with an embodiment.

FIG. 4 is a circuit diagram illustrating the duplex input/output circuit DIO illustrated in FIG. 3 in accordance with an embodiment.

Referring to FIG. 4, the duplex input/output circuit DIO may receive the selecting signal SEL, the first voltage signal V1, the second voltage signal V2, the output signal OUTS, the input signal INS, the read enable signal RE and the write enable signal WE.

The selecting signal SEL may have a first level L1 or a second level L2. For example, the first level L1 may be a logic low level and the second level L2 may be a logic high level, which will not limit the embodiments. The selecting signal SEL may be generated to have the first level L1 during a read operation or a program operation. During a duplex data move operation, the selecting signal SEL may indicate the memory die 100 as a source memory die or a target memory die. For example, during a duplex data move operation, the selecting signal SEL may be generated to have the first level L1 when the memory die 100 is selected as a source memory die. For example, during a duplex data move operation, the selecting signal SEL may be generated to have the second level L2 when the memory die 100 is selected as a target memory die.

For example, the first voltage signal V1 may stay at a ground voltage level. For example, the first voltage signal V1 may stay at a logic low level.

For example, the second voltage signal V2 may stay at an operation voltage level higher than the ground voltage level. For example, the second voltage signal V2 may stay at a logic high level.

The output signal OUTS may be enabled for the memory die 100 to output data. The output signal OUTS may stay enabled while the memory die 100 outputs data. The output signal OUTS may be enabled according to a read command from the controller 12. For example, the output signal OUTS may have a logic high level when enabled and may have a logic low level when disabled.

The input signal INS may be enabled for the memory die 100 to receive data. The input signal INS may stay enabled while the memory die 100 receives data. The input signal INS may be enabled according to a program command from the controller 12. For example, the input signal INS may have a logic high level when enabled and may have a logic low level when disabled.

The duplex input/output circuit DIO may include an output circuit OUTC and an input circuit INC.

The output circuit OUTC may receive the selecting signal SEL, the read enable signal RE, the first voltage signal V1, the second voltage signal V2 and the output signal OUTS. The output circuit OUTC may be coupled to the second buffer CB within the buffer region BF through the data lines DL and may be coupled to the duplex interface circuit DIF through the output bus OUT. The output circuit OUTC may provide output data DOUT, which is from the second buffer CB, to the output bus OUT. The output data DOUT may be data read from the cell region 120 to be output to outside the memory die 100. The output circuit OUTC may include an output activating circuit 1110, an output clock generating circuit 1120 and an output processing circuit 1130.

The output activating circuit 1110 may receive the selecting signal SEL, the output signal OUTS and the first voltage signal V1 and may provide an output activating signal OUTEN to the output processing circuit 1130. In response to the selecting signal SEL, the output activating circuit 1110 may activate the output processing circuit 1130 through the output activating signal OUTEN. Specifically, in response to the selecting signal SEL, the output activating circuit 1110 may output, as the output activating signal OUTEN, one of the output signal OUTS and the first voltage signal V1. The output activating circuit 1110 may output the output signal OUTS as the output activating signal OUTEN when the selecting signal SEL has the first level L1 and may output the first voltage signal V1 as the output activating signal OUTEN when the selecting signal SEL has the second level L2. For example, the output activating signal OUTEN may have a logic high level when enabled and may have a logic low level when disabled.

The output clock generating circuit 1120 may receive the selecting signal SEL, the read enable signal RE and the second voltage signal V2 and may provide an output clock signal OUTCL to the output processing circuit 1130. In response to the selecting signal SEL, the output clock generating circuit 1120 may output, as the output clock signal OUTCL, one of the read enable signal RE and the second voltage signal V2. The output clock generating circuit 1120 may output the read enable signal RE as the output clock signal OUTCL when the selecting signal SEL has the first level L1 and may output the second voltage signal V2 as the output clock signal OUTCL when the selecting signal SEL has the second level L2.

The output processing circuit 1130 may be coupled to the second buffer CB through the data lines DL and may be coupled to the duplex interface circuit DIF through the output bus OUT. In response to the output activating signal OUTEN and the output clock signal OUTCL, the output processing circuit 1130 may receive the output data DOUT from the second buffer CB through the data lines DL and may provide the output data DOUT to the output bus OUT. Specifically, when the output activating signal OUTEN becomes enabled, the output processing circuit 1130 may synchronize the output data DOUT, which is from the second buffer CB, with the output clock signal OUTCL to provide the synchronized output data DOUT to the output bus OUT. The output processing circuit 1130 may include an output latch circuit 1131 and an output driver 1132.

The output latch circuit 1131 may be coupled to the data lines DL through an input node D and may be coupled to the output driver 1132 through an output node Q. In response to the output clock signal OUTCL, the output latch circuit 1131 may receive the output data DOUT from the second buffer CB through the data lines DL and may provide the output data DOUT to the output driver 1132. Specifically, the output latch circuit 1131 may synchronize, with the output clock signal OUTCL, the output data DOUT from the second buffer CB to provide the synchronized output data DOUT to the output driver 1132. For example, the output latch circuit 1131 may include one or more flip-flops.

In response to the output activating signal OUTEN, the output driver 1132 may transfer the output data DOUT from the output latch circuit 1131 to the output bus OUT. Specifically, the output driver 1132 may transfer the output data DOUT from the output latch circuit 1131 to the output bus OUT when the output activating signal OUTEN becomes enabled and might not operate when the output activating signal OUTEN becomes disabled.

The input circuit INC may receive the selecting signal SEL, the read enable signal RE, the write enable signal WE, the second voltage signal V2 and the input signal INS. The input circuit INC may be coupled to the duplex interface circuit DIF through the input bus IN and may be coupled to the second buffer CB through the data lines DL. The input circuit INC may transfer input data DIN from the input bus IN to the second buffer CB. The input data DIN may be provided from an outside of the memory die 100 to be stored into the cell region 120. The input circuit INC may include an input activating circuit 1210, an input clock generating circuit 1220 and an input processing circuit 1230.

The input activating circuit 1210 may receive the selecting signal SEL, the input signal INS and the second voltage signal V2 and may provide an input activating signal INEN to the input processing circuit 1230. In response to the selecting signal SEL, the input activating circuit 1210 may activate the input processing circuit 1230 through the input activating signal INEN. Specifically, in response to the selecting signal SEL, the input activating circuit 1210 may output, as the input activating signal INEN, one of the input signal INS and the second voltage signal V2. The input activating circuit 1210 may output the input signal INS as the input activating signal INEN when the selecting signal SEL has the first level L1 and may output the second voltage signal V2 as the input activating signal INEN when the selecting signal SEL has the second level L2. For example, the input activating signal INEN may have a logic high level when enabled and may have a logic low level when disabled.

The input clock generating circuit 1220 may receive the selecting signal SEL, the write enable signal WE and the read enable signal RE and may provide an input clock signal INCL to the input processing circuit 1230. In response to the selecting signal SEL, the input clock generating circuit 1220 may output, as the input clock signal INCL, one of the write enable signal WE and the read enable signal RE. The input clock generating circuit 1220 may output the write enable signal WE as the input clock signal INCL when the selecting signal SEL has the first level L1 and may output the read enable signal RE as the input clock signal INCL when the selecting signal SEL has the second level L2.

The input processing circuit 1230 may be coupled to the duplex interface circuit DIF through the input bus IN and may be coupled to the second buffer CB through the data lines DL. In response to the input activating signal INEN and the input clock signal INCL, the input processing circuit 1230 may receive the input data DIN from the input bus IN and may provide the input data DIN to the second buffer CB through the data lines DL. Specifically, when the input activating signal INEN becomes enabled, the input processing circuit 1230 may synchronize the input data DIN, which is from the input bus IN, with the input clock signal INCL to provide the synchronized input data DIN to the second buffer CB. The input processing circuit 1230 may include an input driver 1232 and an input latch circuit 1231.

In response to the input activating signal INEN, the input driver 1232 may transfer the input data DIN from the input bus IN to an input node D of the input latch circuit 1231. Specifically, the input driver 1232 may transfer the input data DIN from the input bus IN to the input node D of the input latch circuit 1231 when the input activating signal INEN becomes enabled and might not operate when the input activating signal INEN becomes disabled. Therefore, even when the duplex interface circuit DIF provides the input data DIN to the first to fourth input buses IN1 to IN4 illustrated in FIG. 1, enabled may be only the input activating signal INEN for the memory die to store therein the input data DIN and the input driver 1232 may receive the input data DIN.

The input latch circuit 1231 may be coupled to the input driver 1232 through the input node D and may be coupled to the data lines DL through an output node Q. In response to the input clock signal INCL, the input latch circuit 1231 may receive the input data DIN from the input driver 1232 and may provide the input data DIN to the second buffer CB through the data lines DL. Specifically, the input latch circuit 1231 may receive, in response to the input clock signal INCL, the input data DIN from the input driver 1232 to provide the synchronized input data DIN to the second buffer CB. For example, the input latch circuit 1231 may include one or more flip-flops.

Figure 5:
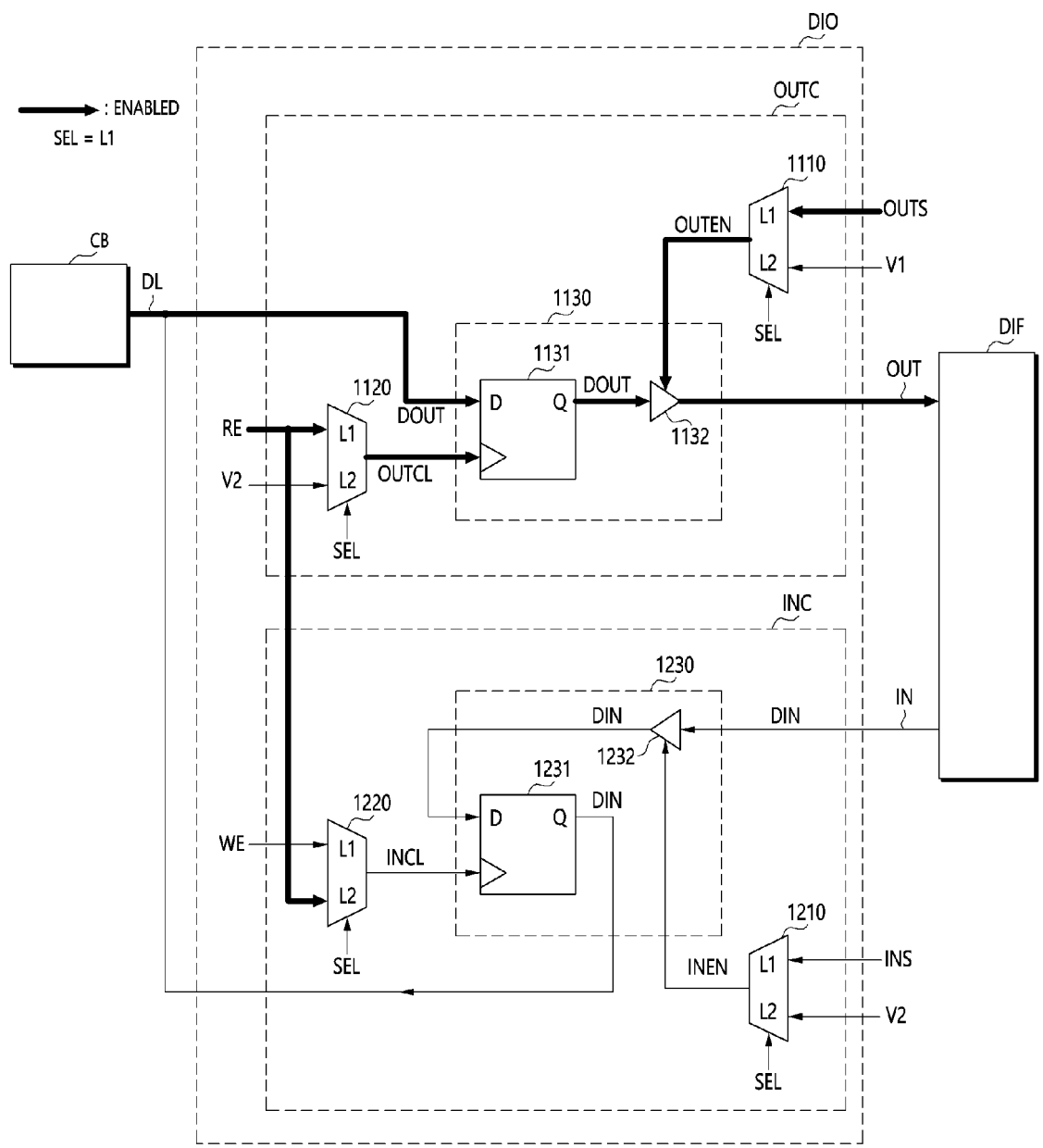
FIG. 5 is a diagram illustrating an operation of the duplex input/output circuit illustrated in FIG. 4.

FIG. 5 is a diagram illustrating an operation of the duplex input/output circuit DIO illustrated in FIG. 4. The operation to be described with reference to FIG. 5 may be performed during a normal read operation. The operation to be described with reference to FIG. 5 may be performed during a duplex data move operation that the memory die 100 is to perform as a source memory die.

Referring to FIG. 5, in order for the duplex input/output circuit DIO to transfer the output data DOUT from the second buffer CB to the output bus OUT, the control circuit 110 may provide the duplex input/output circuit DIO with the selecting signal SEL having the first level L1 and the enabled output signal OUTS. Also, the control circuit 110 may provide the duplex input/output circuit DIO with the disabled input signal INS. The read enable signal RE may be toggling and the write enable signal WE may stay disabled.

In response to the selecting signal SEL having the first level L1, the output activating circuit 1110 may output the enabled output signal OUTS as the enabled output activating signal OUTEN. In response to the selecting signal SEL having the first level L1, the output clock generating circuit 1120 may output the toggling read enable signal RE as the output clock signal OUTCL. The output latch circuit 1131 may synchronize the output data DOUT, which is from the second buffer CB, with the output clock signal OUTCL to provide the output driver 1132 with the synchronized output data DOUT. In response to the enabled output activating signal OUTEN, the output driver 1132 may transfer the output data DOUT from the output latch circuit 1131 to the output bus OUT.

In response to the selecting signal SEL having the first level L1, the input activating circuit 1210 may output the disabled input signal INS as the disabled input activating signal INEN. In response to the selecting signal SEL having the first level L1, the input clock generating circuit 1220 may output the disabled write enable signal WE as the disabled input clock signal INCL. Therefore, in response to the disabled input clock signal INCL and the disabled input activating signal INEN, the input processing circuit 1230 might not operate.

Figure 6:
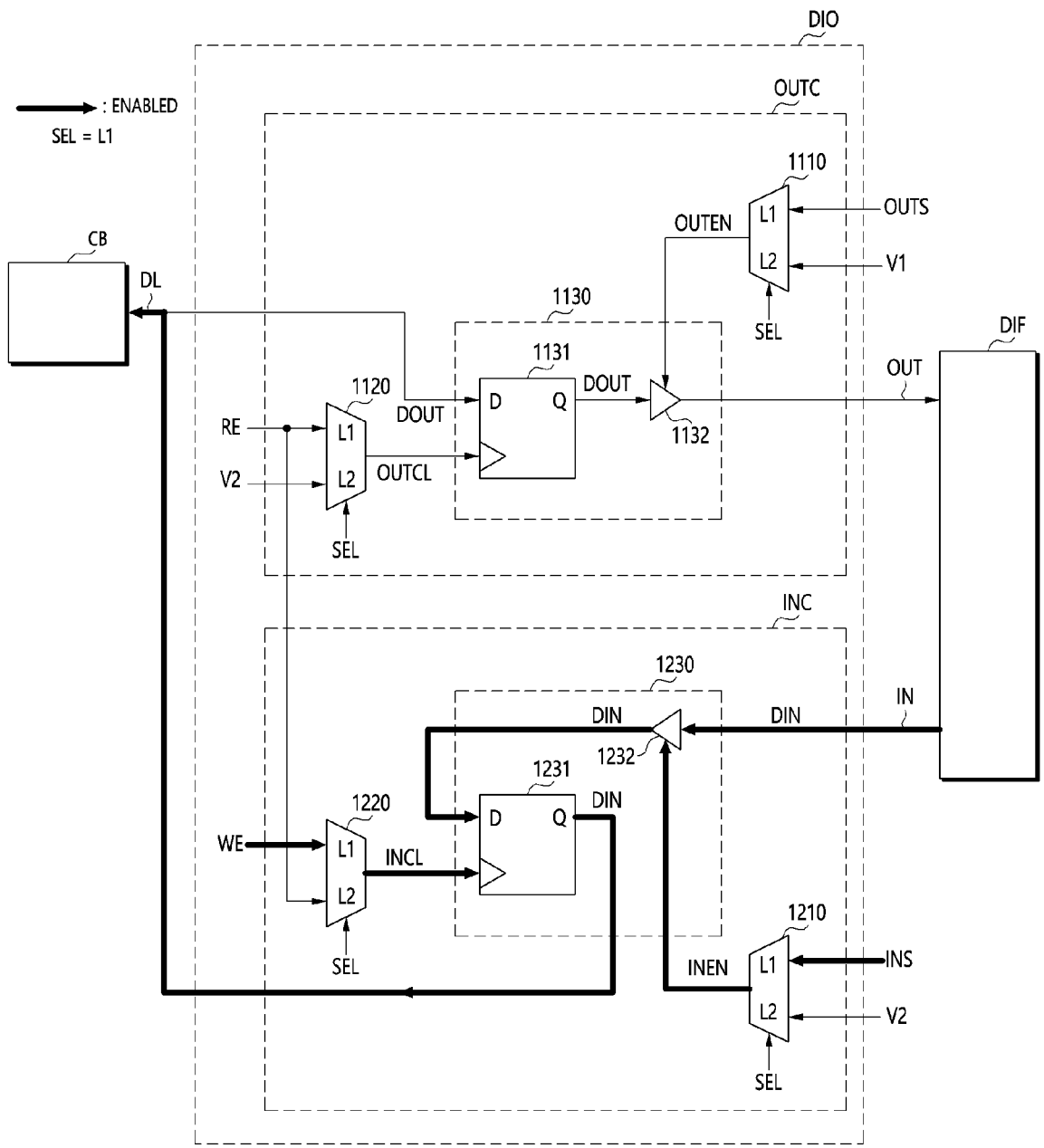
FIG. 6 is a diagram illustrating an operation of the duplex input/output circuit illustrated in FIG. 4.

FIG. 6 is a diagram illustrating an operation of the duplex input/output circuit DIO illustrated in FIG. 4. The operation to be described with reference to FIG. 6 may be performed during a normal program operation.

Referring to FIG. 6, in order for the duplex input/output circuit DIO to transfer the input data DIN from the input bus IN to the second buffer CB, the control circuit 110 may provide the duplex input/output circuit DIO with the selecting signal SEL having the first level L1 and the enabled input signal INS. Also, the control circuit 110 may provide the duplex input/output circuit DIO with the disabled output signal OUTS. The write enable signal WE may be toggling and the read enable signal RE may stay disabled.

In response to the selecting signal SEL having the first level L1, the input activating circuit 1210 may output the enabled input signal INS as the enabled input activating signal INEN. In response to the selecting signal SEL having the first level L1, the input clock generating circuit 1220 may output the toggling write enable signal WE as the input clock signal INCL. In response to the enabled input activating signal INEN, the input driver 1232 may transfer the input data DIN from the input bus IN to the input latch circuit 1231. In response to the input clock signal INCL, the input latch circuit 1231 may transfer the input data DIN from the input driver 1232 to the second buffer CB.

In response to the selecting signal SEL having the first level L1, the output activating circuit 1110 may output the disabled output signal OUTS as the disabled output activating signal OUTEN. In response to the selecting signal SEL having the first level L1, the output clock generating circuit 1120 may output the disabled read enable signal RE as the disabled output clock signal OUTCL. Therefore, in response to the disabled output clock signal OUTCL and the disabled output activating signal OUTEN, the output processing circuit 1130 might not operate.

Figure 7:
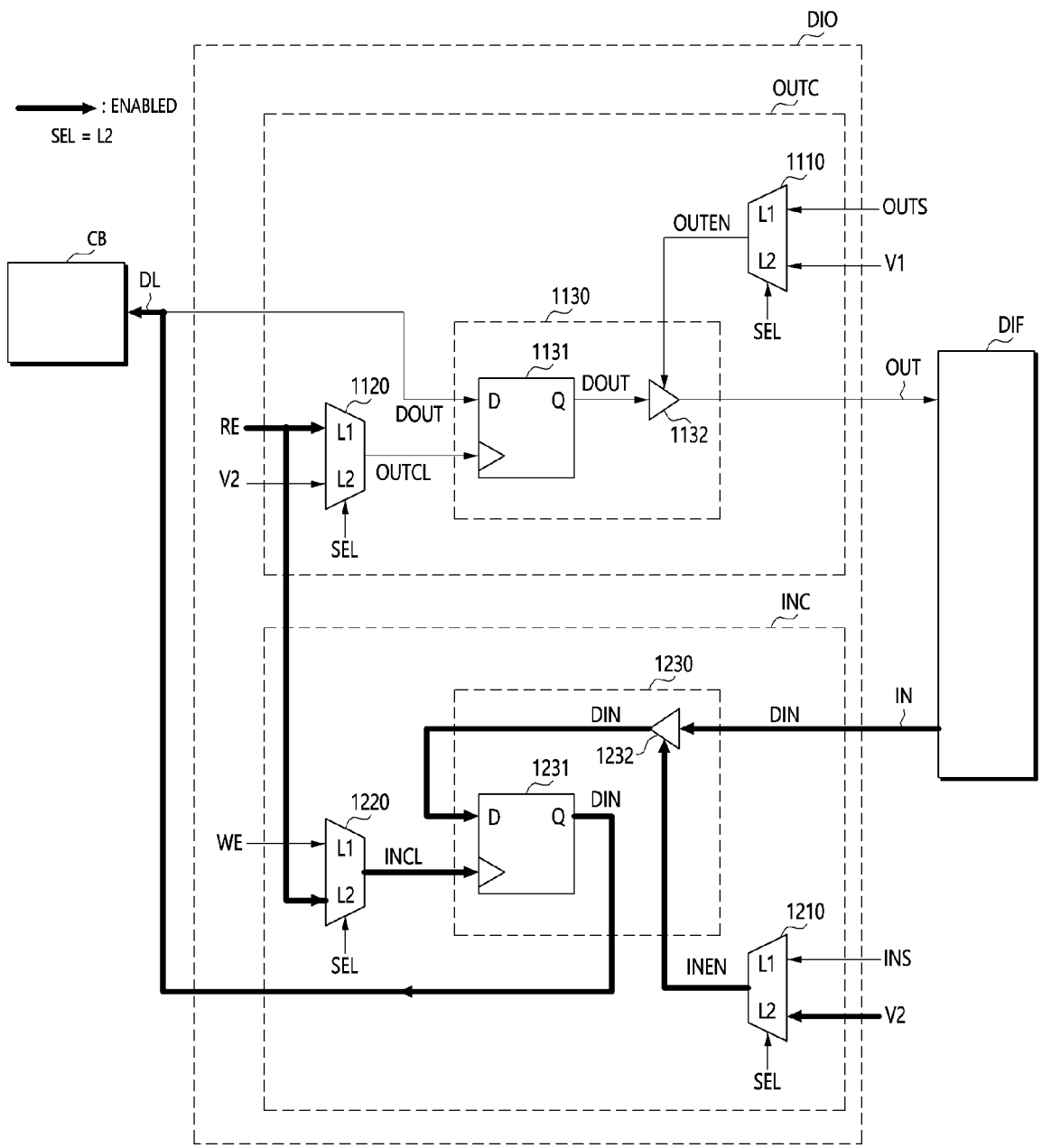
FIG. 7 is a diagram illustrating an operation of the duplex input/output circuit illustrated in FIG. 4.

FIG. 7 is a diagram illustrating an operation of the duplex input/output circuit DIO illustrated in FIG. 4. The operation to be described with reference to FIG. 7 may be performed during a duplex data move operation that the memory die 100 is to perform as a target memory die.

Referring to FIG. 7, in order for the duplex input/output circuit DIO to transfer the input data DIN from the input bus IN to the second buffer CB during the duplex data move operation, the control circuit 110 may provide the duplex input/output circuit DIO with the selecting signal SEL having the second level L2. Also, the control circuit 110 may provide the duplex input/output circuit DIO with the disabled input signal INS and the disabled output signal OUTS.

The read enable signal RE may be toggling and the write enable signal WE may stay disabled.

In response to the selecting signal SEL having the second level L2, the input activating circuit 1210 may output the second voltage signal V2 having a logic high level as the enabled input activating signal INEN. In response to the selecting signal SEL having the second level L2, the input clock generating circuit 1220 may output the toggling read enable signal RE as the input clock signal INCL. In response to the enabled input activating signal INEN, the input driver 1232 may transfer the input data DIN from the input bus IN to the input latch circuit 1231. In response to the input clock signal INCL, the input latch circuit 1231 may transfer the input data DIN from the input driver 1232 to the second buffer CB. That is, the input data DIN may be provided according to the read enable signal RE, with which the output data DOUT is to be synchronized. Therefore, in an embodiment, data may be moved directly from a target memory die to a source memory die during the duplex data move operation.

In response to the selecting signal SEL having the second level L2, the output activating circuit 1110 may output the first voltage signal V1 having a logic low level as the disabled output activating signal OUTEN. In response to the selecting signal SEL having the second level L2, the output clock generating circuit 1120 may output the second voltage signal V2 as the disabled output clock signal OUTCL. Therefore, in response to the disabled output clock signal OUTCL and the disabled output activating signal OUTEN, the output processing circuit 1130 might not operate.

Figure 8:
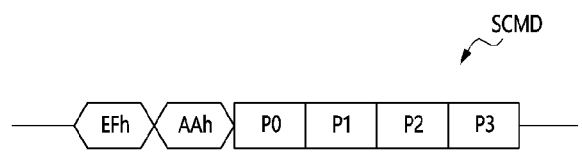
FIG. 8 is a diagram illustrating a setting command in accordance with an embodiment.

FIG. 8 is a diagram illustrating a setting command SCMD in accordance with an embodiment.

Referring to FIG. 8, in order to control the operation of a target memory die during a duplex data move operation, the controller 12 may provide the setting command SCMD to the target memory die. In an embodiment, in order to control the operation of a source memory die during a duplex data move operation, the controller 12 may provide the setting command SCMD to the source memory die.

The setting command SCMD may include a command EFh, an address AAh and first to fourth parameters P0 to P3.

For example, the command EFh may be a set feature command, which will not limit the embodiment.

The address AAh may indicate locations, in which the first to fourth parameters P0 to P3 are stored within the operation information memory 115.

The first parameter P0 may represent a page address of a target page, the second parameter P1 may represent a memory block address of a target memory block and the third parameter P2 may represent a memory die address of a target memory die. The fourth parameter P3 may represent the memory die 100 as one of a source memory die and a target memory die. For example, the fourth parameter P3 may have a value of '00h' when the memory die 100 operates as a source memory die and may have a value of '01h' when the memory die 100 operates as a target memory die.

The memory die 100 may receive the setting command SCMD in response to the memory die address thereof represented by the third parameter P2 within the setting command SCMD. In response to the setting command SCMD, the memory die 100 may store, in the operation information memory 115, the first to fourth parameters P0 to P3 included in the setting command SCMD. By referring to the operation information memory 115, the memory die 100 may operate as one of a source memory die and a target memory die during a duplex data move operation.

Figure 9:
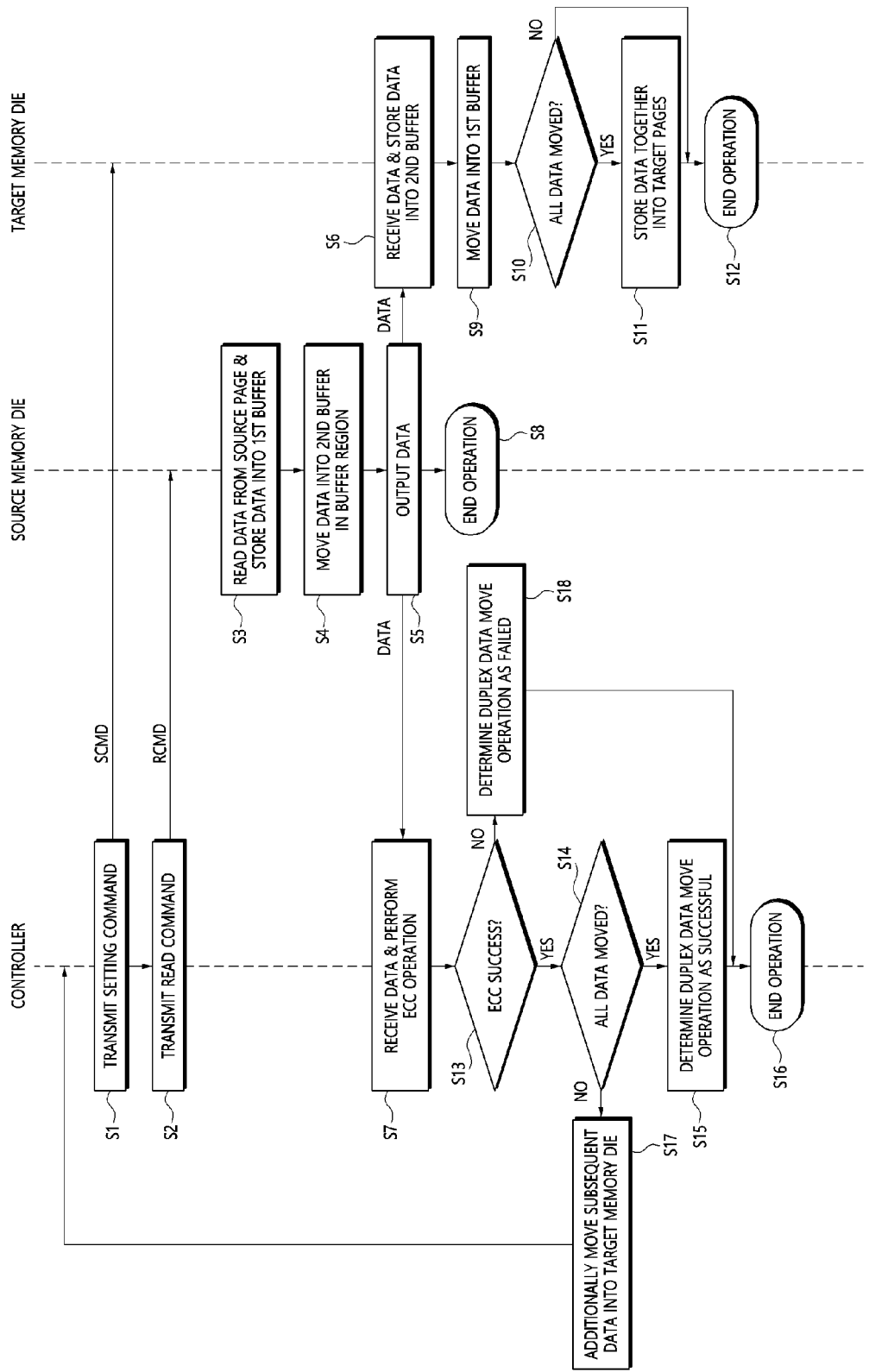
FIG. 9 is a diagram illustrating a duplex data move operation of a storage device in accordance with an embodiment.

FIG. 9 is a diagram illustrating a duplex data move operation of the storage device 10 in accordance with an embodiment.

Referring to FIG. 9, the controller 12 may provide the setting command SCMD to a target memory die at step S1.

At step S2, the controller 12 may provide a source memory die with a read command RCMD. The read command RCMD may include a page address of a source page, a memory block address of a source memory block and a memory die address of the source memory die. The read command RCMD may be provided after the setting command SCMD because the source memory die is to immediately perform or perform a read operation in response to the read command RCMD at step S3. The controller 12 may provide the toggling read enable signal RE to both the source memory die and the target memory die.

At step S3, in response to the read command RCMD, the source memory die may read data from the source page and may store the read data into the first buffer MB within the buffer region BF.

At step S4, the source memory die may move the data from the first buffer MB to the second buffer CB within the buffer region BF.

At step S5, the source memory die may output the data from the second buffer CB to the duplex interface circuit DIF through the output circuit OUTC within the source memory die. Specifically, as described with reference to FIG. 5, the output circuit OUTC within the source memory die may output, in response to the read enable signal RE, the data from the second buffer CB to the duplex interface circuit DIF through the output bus OUT. The duplex interface circuit DIF may transfer the data from the source memory die to the target memory die and the controller 12.

At step S6, the target memory die may receive the data from the duplex interface circuit DIF through the input circuit INC within the target memory die and may store the data into the second buffer CB. Specifically, as described with reference to FIG. 7, the input circuit INC within the target memory die may store, in response to the read enable signal RE, the data into the second buffer CB, the data being received from the duplex interface circuit DIF through the input bus IN.

At step S7, the controller 12 may receive the data from the duplex interface circuit DIF and may perform an error correcting operation on the data. Steps S5 to S7 may be performed in a parallel manner. Steps S5 to S7 may partially overlap each other.

At step S8, the source memory may end an operation when data output is completed. That is, the source memory die may become in a ready state.

At step S9, when the receiving of the data into the second buffer CB is completed, the target memory die may move the data from the second buffer CB into the first buffer MB.

At step S10, the target memory die may determine whether all data to be stored into all target pages are moved into the target memory die, i.e., whether all data to be stored into all target page are stored in the first buffer MB. When all data are determined as stored in the first buffer MB, the process may proceed to step S11. When all data are determined as not yet stored in the first buffer MB, the process may proceed to step S12.

At step S11, the target memory die may store all the data from the first buffer MB together into target pages. Step S11 may be performed regardless of the result of the error correcting operation of step S7.

At step S12, the target memory die may end an operation. That is, the target memory die may become in a ready state.

When the process proceeds to step S12 directly from step S10, the data stored in the first buffer MB within the target memory die may be kept as is in the ready state.

At step S13, the controller 12 may determine whether the error correcting operation fails or succeeds. Step S13 may be performed independently of steps S8 to S12. Step S13 may be performed with steps S8 to S12 in a parallel manner. When the error correcting operation is determined as a success, the process may proceed to step S14. When the error correcting operation is determined as a fail, the process may proceed to step S18.

At step S14, the controller 12 may determine whether all data to be stored into all target pages are moved into the target memory die. When all data are determined as moved into the target memory die, the process may proceed to step S15. When all data are determined as not yet moved into the target memory die, the process may proceed to step S17.

At step S15, the controller 12 may determine the duplex data move operation as a success.

At step S16, the controller 12 may end an operation.

At step S17, the controller 12 may determine to further move subsequent data into the target memory die. The subsequent data may be to be stored into a target page other than the target page, into which the previously moved data is to be stored. For example, when the previously moved data is LSB data to be stored into the target memory region TMR, the subsequent data may be CSB data to be stored into the target memory region TMR. Therefore, the process may proceed back to step S1 and the storage device 10 may repeat the above-described operations for moving the CSB data.

At step S18, the controller 12 may determine the duplex data move operation as a fail.

In accordance with an embodiment, the input/output circuit, the memory die, the memory device and the storage device may effectively perform a data move operation.

While certain embodiments have been described above, it will be understood to those skilled in the art that the embodiments described are by way of example only. Accordingly, the input/output circuit, the memory die, the memory device and the storage device should not be limited based on the described embodiments. Rather, the input/output circuit, the memory die, the memory device and the storage device described herein should only be limited in light of the claims that follow when taken in conjunction with the above description and accompanying drawings.

What is claimed is:

1. A duplex input and output (input/output) circuit of a memory die, the duplex input/output circuit comprising:
   an output circuit configured to receive output data from a data line coupled to a buffer region and output the output data to an output bus, in response to a selecting signal, a read enable signal, and an output signal; and
   an input circuit configured to receive input data from an input bus, which is separate from the output bus, and output the input data to the data line, in response to the selecting signal, the read enable signal, a write enable signal, and an input signal.

2. The duplex input/output circuit of claim 1, wherein the output circuit includes:
   an output activating circuit configured to output an output activating signal in response to the selecting signal and the output signal;
   an output clock generating circuit configured to output the read enable signal as an output clock signal in response to the selecting signal; and
   an output processing circuit configured to synchronize, in response to the output activating signal, the output data from the data line with the output clock signal to output the synchronized output data to the output bus.

3. The duplex input/output circuit of claim 2, wherein the output activating circuit is configured to receive the output signal and a first voltage signal and configured to output, in response to the selecting signal, one of the output signal and the first voltage signal as the output activating signal.

4. The duplex input/output circuit of claim 2, wherein the output clock generating circuit is configured to receive the read enable signal and a second voltage signal and configured to output, in response to the selecting signal, one of the read enable signal and the second voltage signal as the output clock signal.

5. The duplex input/output circuit of claim 2, wherein the output processing circuit includes:
   an output latch circuit configured to receive the output data from the data line and configured to synchronize the output data with the output clock signal to output the synchronized output data; and
   an output driver configured to output, in response to the output activating signal, the output data from the output latch circuit to the output bus.

6. The duplex input/output circuit of claim 1, wherein the input circuit includes:
   an input activating circuit configured to output an input activating signal in response to the selecting signal and the input signal;
   an input clock generating circuit configured to output one of the read enable signal and the write enable signal as an input clock signal in response to the selecting signal; and
   an input processing circuit configured to synchronize, in response to the input activating signal, the input data from the input bus with the input clock signal to output the synchronized input data to the data line.

7. The duplex input/output circuit of claim 6, wherein the input activating circuit is configured to receive the input signal and a second voltage signal and configured to output, in response to the selecting signal, one of the input signal and the second voltage signal as the input activating signal.

8. The duplex input/output circuit of claim 6, wherein the output processing circuit includes:
   an input driver configured to output, in response to the input activating signal, the input data received from the input bus; and
   an input latch circuit configured to output, in response to the input clock signal, the input data received from the input driver to the data line.

9. A memory die comprising:
   a cell region including a plurality of memory regions;
   a buffer region configured to store data therein;
   a duplex input and output (input/output) circuit configured to transfer output data from the buffer region to an output bus in response to a selecting signal and a read enable signal and configured to transfer input data from an input bus, which is separate from the output bus, to the buffer region in response to the selecting signal and the read enable signal; and
   a control circuit configured to generate the selecting signal.

10. The memory die of claim 9, wherein the control circuit is configured to generate, in response to a read command, the selecting signal having a first level to control the duplex input/output circuit to provide the output data to the output bus.

11. The memory die of claim 9, wherein the control circuit is configured to generate, in response to a setting command, the selecting signal having a second level to control the duplex input/output circuit to receive the input data from the input bus.

12. The memory die of claim 9, wherein the control circuit is configured to generate the selecting signal in response to a setting command including a parameter indicating the memory die as one of a source memory die and a target memory die for a duplex data move operation.

13. The memory die of claim 9, wherein the duplex input/output circuit is configured to provide the output data to the output bus when the selecting signal has a first level and the read enable signal toggles and configured to receive the input data from the input bus when the selecting signal has a second level and the read enable signal toggles.

14. The memory die of claim 9, wherein the control circuit is configured to end, after the input data is stored in the buffer region, an operation while keeping the input data in the buffer region when all data to be stored in a target memory region are determined as not yet stored in the buffer region.

15. The memory die of claim 9, wherein the control circuit is configured to store, after the input data is stored in the buffer region, all data together into a target memory region when the all data to be stored in the target memory region are determined as stored in the buffer region.

16. A memory device comprising:
a duplex interface circuit;
a first memory die coupled to the duplex interface circuit through a first input bus and a first output bus which is separate from the first input bus; and
a second memory die coupled to the duplex interface circuit through a second input bus and a second output bus which is separate from the second input bus.

17. The memory device of claim 16, wherein the first memory die is configured to output, in response to a read command, data to the duplex interface circuit through the first output bus and the second memory die is configured to receive, in response to a setting command, the data from the duplex interface circuit through the second input bus.

18. The memory device of claim 17, wherein the outputting of the data by the first memory die and the receiving of the data by the second memory die partially overlap each other.

19. The memory device of claim 17,
wherein the first memory die includes an output circuit configured to output, in response to a selecting signal having a first level, the data to the first output bus, and
wherein the second memory die includes an input circuit configured to receive, in response to the selecting signal having a second level, the data from the second input bus.

20. The memory device of claim 17, wherein the setting command is provided to the second memory die before the read command is provided to the first memory die.

21. The memory device of claim 17, wherein the setting command includes a parameter indicating the second memory die as a target memory die for a duplex data move operation.

22. The memory device of claim 16, wherein the first memory die and the second memory die are configured to simultaneously receive a toggling read enable signal, the first memory die is configured to provide the duplex interface circuit with data synchronized with the read enable signal, and the second memory die is configured to receive the data from the duplex interface circuit in response to the read enable signal.

23. A storage device comprising:
a memory device including a first memory die, a second memory die and a duplex interface circuit; and
a controller configured to control the memory device such that the first memory die outputs data to the duplex interface circuit and the second memory die receives the data from the duplex interface circuit, the outputting of the data by the first memory die and the receiving of the data by the second memory die partially overlap with each other.

24. The storage device of claim 23,
wherein the controller is configured to provide a toggling read enable signal to the memory device to control the memory device, and
wherein the first memory die and the second memory die are configured to simultaneously receive the read enable signal.

25. The storage device of claim 24, wherein the first memory die is configured to provide, in response to the read enable signal, the duplex interface circuit with the data synchronized with the read enable signal, and the second memory die is configured to receive the data from the duplex interface circuit in response to the read enable signal.

26. The storage device of claim 23, wherein the controller is configured to provide a setting command to the second memory die and then provide a read command to the first memory die to control the first memory die and the second memory die.

27. The storage device of claim 23, wherein the controller is configured to receive the data from the duplex interface circuit and configured to perform an error correcting operation on the data, in parallel with the receiving of the data by the second memory die.

28. The storage device of claim 27, wherein the controller is configured to determine to further move subsequent data into the second memory die when the error correcting operation is successful and all data to be stored into a target memory region within the second memory die are determined as not yet moved into the second memory die.

* * * * *